United States Patent [19]

Meckler

[11] 4,211,613
[45] Jul. 8, 1980

[54] GEOTHERMAL MINERAL EXTRACTION SYSTEM

[76] Inventor: Milton Meckler, 16348 Tupper St., Sepulveda, Calif. 91343

[21] Appl. No.: 855,358

[22] Filed: Nov. 28, 1977

[51] Int. Cl.$^2$ .............................................. C02B 1/04
[52] U.S. Cl. ........................................ 203/11; 203/47; 203/48; 203/88; 203/100; 203/DIG. 1; 203/DIG. 14; 202/174; 23/298; 159/1 G; 165/45; 299/5
[58] Field of Search ................... 203/11, 47, 48, 10, 203/100, 99, 88, 73, DIG. 1, DIG. 14; 202/173, 174, 234; 299/4, 5, 17; 23/298; 165/45; 126/270, 271; 159/1 G

[56] References Cited

U.S. PATENT DOCUMENTS

| | | | |
|---|---|---|---|
| 1,607,586 | 11/1926 | Claytor | 299/5 |
| 2,444,629 | 7/1948 | Bromberg | 299/17 |
| 2,490,659 | 12/1949 | Snyder | 202/174 |
| 3,140,986 | 7/1964 | Hubbard | 203/100 |
| 3,386,768 | 6/1968 | Jacoby et al. | 299/4 |
| 3,676,078 | 7/1972 | Jacoby | 299/5 |
| 3,679,264 | 7/1972 | Van Huisen | 299/4 |
| 3,951,457 | 4/1976 | Redford | 299/5 |
| 4,046,640 | 9/1977 | Carson | 203/DIG. 1 |
| 4,132,075 | 1/1979 | Fleck et al. | 203/73 |

Primary Examiner—Wilbur L. Bascomb, Jr.
Attorney, Agent, or Firm—Marvin E. Jacobs

[57] ABSTRACT

Minerals are recovered from warm geothermal brines by installing a brine eductor device such as a venturi at the end of a thermally insulated drill casing. The geothermal brine is recovered by flowing a warm, low saline carrier solution at high flow rate through the device to pick up a selected flow of brine. On entering the device the geothermal brine is diluted in an amount sufficient to preclude precipitation and scaling as the mixture flows to the surface. The flow velocity is adequate to entrain any non-dissolved solids without settlement. Thermal losses to the surrounding strata are minimized by the thermal insulation surrounding the casing. The mineral values are recovered from the mixture by flashing, evaporation, and filtration. Clarified solution, filter liquor and make-up water as necessary are combined to form the low salinity carrier solution which is heated in heat exchangers before recycling to the eductor device. The heat exchange fluid may be heated by solar concentrators assisted by fossil fuel, geothermal and/or solar buffer stages.

25 Claims, 4 Drawing Figures

GEOTHERMAL MINERAL EXTRACTION SYSTEM

BACKGROUND OF THE INVENTION

1. Field of the Invention

The present invention relates to recovery of mineral values from hot geothermal brines and, more particularly, to an improved brine recovery system which avoids precipitation and scaling in the well and surface recovery equipment.

2. Description of the Prior Art

The utilization of geothermal energy has been, for the most part, concerned with recovery of and utilization of steam to generate electricity by means of a steam turbine driven generator or, where there is a demand for heat in the immediate vicinity of the field, recovered steam or hot water can be employed for space, process, road surface or agricultural heating as appropriate. Where the development of geothermal steam is technically and economically feasible, in an area of significant geothermal discovery, often a public or private electric utility must be induced to buy and distribute the power. To overcome the natural tendency of electric utilities to use conventional fossil or nuclear fuel sources for scheduling power production some years in advance, geothermal suppliers must be willing and able to harness steam in sufficiently large quantities to make reasonable reliance on supply and/or relative costs attractive to the utilities.

Another aspect of geothermal resource development which may hold greater initial promise, in areas similar to the Salton Sea in California is the value of minerals which are present in the geothermal brines in enormous quantities. Current activities are devoted to economic disposal of bitterns associated with the operation and separation of other minerals from the mineral-rich brine. In the Imperial Valley area, the brine is known to contain potassium, lithium, sodium, calcium, strontium, molybdenum, cesium, boron, copper, gold, lead, zinc, silver, iron and manganese in quantities of a theoretical value per well-day of $5,000 for potash, $280 for silver, $480 for borax, $50 for copper, $125 for lead, $650 for zinc, and $30,000 for lithium. Yet technical problems persist relating to corrosion, disposal of bitterns, the separation of the minerals from the brine and other physical problems.

Geothermal operations are somewhat of a gamble at this point—not only as to the likelihood of finding a sufficient quantity to be marketable for power only but also as to finding a market. Well drilling costs range from $35,000 to $400,000. The development of a reliable process for brine extraction under conditions minimizing the rapid build-up of solids resulting in the plugging of lines, nozzles, etc., could make marketing minerals a more deliberate and definable operation than sole reliance on marketing power. This would attract companies interested in developing minerals primarily and energy secondarily from such deposits.

Experience with a flash process as at Niland, Calif. in which geothermal brines were processed at successively lower temperatures and pressures indicates that long periods of operation can be logged before shutdown of the facility for inspection and maintenance. Samples of the brine, suspended solids, and scale deposits were analyzed for bulk composition and mineralogy, but correlation with temperature and pressure was vague.

In general, a galena-rich scale was observed in valves and piping ahead of the first-stage separator, becoming much less abundant beyond that point. The bulk of the scale consisted of an increasing proportion of an iron-rich amorphous silica with process progression. Trace crystalline phases, such as akaganeite, kutnahorite, annd shpalerite and/or wurtzite have been detected or are strongly suspected in the scales. Halite and sylvite are found primarily as a result of numerous facility shutdowns and subsequent cooling of the retained brine in the equipment. Barite is frequently present when irrigation water (used for priming the wells) containing $SO_4$ is mixed with the brine. Calcite and/or argonite are also found whenever separated steam condensate in contact with $CO_2$ is recombined with the brine. Corrosion products, magnetic and hematite, form an integral part of the scale adjacent to steel walls. The scales were layered with bands of widely differing material. The color, texture, hardness and thickness of the deposits also varied considerably.

Research sponsored by U.S. Energy Research and Development Administration on scaling characteristics of these brines demonstrated that temperature was believed to be the dominant phenomenon (*Modeling The Temperature-Dependent Scale Accumulation From Geothermal Brine*, R. C. Schroeder; UCRL-52145). Another report under the same contract indicated the influence of mineralogical chemical composition of brine in scaling and that the amount and rate of deposition of scale is dependent on the salinity of the brine (*Scaling Characteristics In The Geothermal Loop Experimental Facility At Niland, California*, Roland Quong; UCRL-52162).

SUMMARY OF THE INVENTION

A system for the reliable and continuous extraction of minerals from geothermal brines has been developed in accordance with this invention. The system results in the recovery of the brine and extraction of the minerals under conditions minimizing build-up of solids on the surfaces of the process lines and process equipment in contact with the brine. The system of the invention can operate for extended periods of service without the need to shutdown the well or the surface recovery system for maintenance and/or descaling.

The system of the invention secondarily recovers thermal energy which can be utilized in several different modes in the process. Desalinized water can be recovered from the flashed and evaporated brine or from the make-up water. Thermal input is desirably produced by solar water heaters backed-up by solar buffer storage and fossil fuel heaters for nighttime operation or for operation on cloudy days. Waste water reinjection can also be practiced to maintain pressure in the field and to prevent subsidence.

The geothermal brine extraction system of the invention includes a down-hole brine recovery assembly and a surface situated mineral extraction subsystem cooperating therewith and in which the carrier fluid for operating the recovery assembly is formed and heated to the desired temperature.

The brine recovery assembly includes a cased geothermal wall having a top end extending from the surface of the earth downwardly to a bottom end disposed within a geothermal aquifer containing geothermal brine having a salt content above 10,000 ppm. The aquifer need not be at a high pressure due to the inductor brine pick-up operation of the invention. An inductor device, suitably a venturi or a turbine pump combination is disposed in the aquifer zone having the inlet of a brine pick-up nozzle in communication with the geothermal fluid, a low saline solution flow inlet in communication with the annulus defined between the casing and the recovery tube and having an outlet in communication with the recovery tube.

The low salinity solution enters the venturi at a temperature and saline content such that the dilution to form the resultant recovery mixture is sufficient to prevent precipitation generally by diluting to below saturation. Precipitation is further minimized compared to conventional geothermal brine recovery systems in which hot concentrated brines contact the relatively cooler surfaces of the metal well casing.

The low salinity solution is circulated at a high flow rate and velocity adequate to entrain any non-dissolved solids without settlement. Thermal losses during recovery are minimized due to the thermally insulated casing and due to the natural geothermal gradient of the surrounding subsurface strata, the salinity content of the brine, flow rate, size and configuration of the venturi and entering temperature of the brine and exit temperature of the mixture. However, generally the salinity of the solution should be at least 10% lower than that of the brine. The temperature differential will also vary depending on other parameters. However, the temperature of the solution should preferably be no more than ±50° C. to 100° C. of the temperature of the geothermal brine.

The flow rate should be sufficient to recover economical amounts of mineral values. Typical flow rates are from $10^4$ to $10^7$ pounds per hour of low salinity solution and typical aquifers contain brines having saline contents of 10,000 to 40,000 ppm TDS (total dissolved solids) and are at a pressure of 50 to 300 psig and a temperature from 150° C. to 650° C.

The recovered mixed solution is processed in series through a flash tank, multiple effect evaporator, crystallizer filter and drier. The flashed steam, decanted liquid from the crystallizer, clarified liquid from filters are combined with make-up water which can be saline water such as from the Salton Sea to form the low salinity carrier fluid. The fluid is heated indirectly with solar or fossil fuel heated heat exchange fluid. The continuous loop is closed by returning a portion of the solution to the venturi and reinjecting the remainder into the aquifer by means of a reinjection well.

These and many other features and attendant advantages of the invention will become apparent as the invention becomes better understood by reference to the detailed description when considered in conjunction with the accompanying drawings.

DESCRIPTION OF THE PREFERRED EMBODIMENTS

Figure 1:
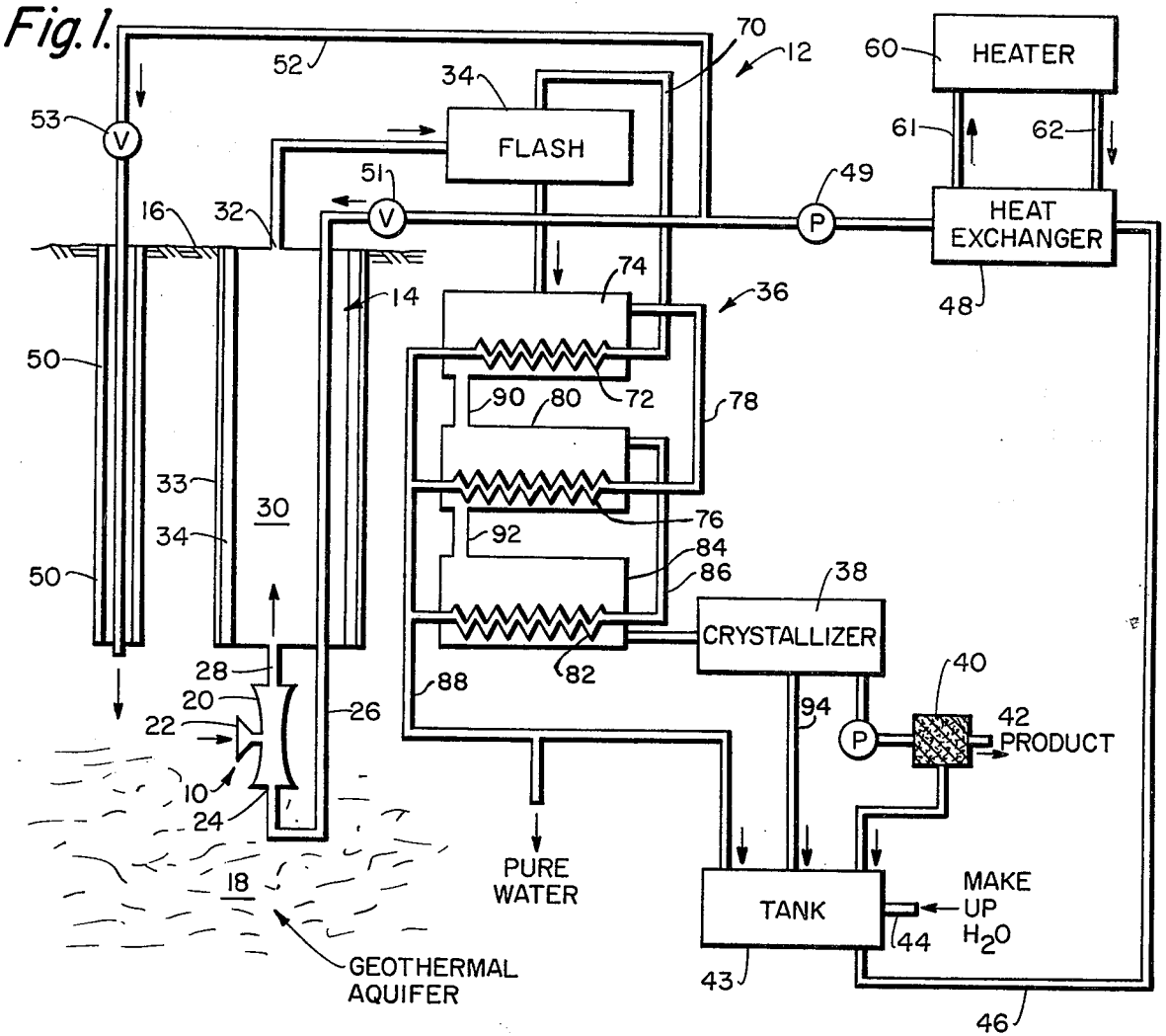
FIG. 1 is schematic and block diagrammatic view of a first embodiment of the induced geothermal brine recovery system of the invention.

Referring now to FIG. 1, the geothermal brine extraction and mineral recovery system of the invention generally includes a subsurface recovery system 10 communicating in a closed loop with a surface brine concentration and mineral recovery system 12. The brine recovery system 10 includes a geothermal well 14 extending from the surface 16 into a common geothermal aquifer 18. A brine eductor device 20 is installed at the bottom of the well having a brine inlet 22 in communication with the geothermal fluid. The device 20, suitably in the form of a venturi has an inlet 24 connected to a dilute brine conduit 26 and an outlet 28 in communication with the annulus 30 of the geothermal well. As the low salinity solution circulates at high flow rate through the device 20 the geothermal brine from the aquifer enters inlet 22 and forms a mixed solution which flows out of outlet 28 into the annulus of the geothermal well 14 and flows to the surface and leaves the well through outlet 32.

The low salinity solution is at a temperature approaching the temperature regime of the geothermal brine. Therefore, on forming the diluted mixture, precipitation is precluded within the device. Furthermore, salt precipitation does not occur during delivery of the mixture to the surface recovery system due to the preservation of temperature and pressure within the geothermal well which has a layer of insulation 33 surrounding the casing 34. The layer 33 is suitably formed by pouring an insulating cement such as one containing vermiculite between the outermost section of each metal casing 34 of the well 14. The mixture is maintained above conditions conducive to scaling or precipitation by adjusting the temperature of the low salinity solution within pipe 26 to maintain the mixture at the desired minimum temperature. Furthermore, heat transfer will occur within the insulated casing from the outer inlet pipe 26 to the relatively cooler mixture within the annulus 30. The concentration ratio between the low salinity sweep solution and the brine are also adjusted to levels to avoid salt precipitation.

The brine mixture leaving outlet 32 is successively treated in flash tank 34, evaporation-concentration unit 36, crystallizer 38 and filter 40 to form product minerals 42 and various by-product liquid streams which are combined in tank 43 with make-up water 44 as required to form the low salinity solution which is then delivered through the line 46 to heat exchanger 48 which receives a cyclic flow of heat exchange fluid in a circuit including return conduit 61, heater 60 and delivery conduit 62 before being recycled at high flow rate to the eductor device 20 by means of pump 49 or to reinjection well 50 through conduit 52. Check valves 51, 53 prevent reverse flow of pressurized geothermal brine into lines 26 or 52.

The evaporator-concentrator may be a multi-effect evaporator as shown or can be any other suitable concentration device such as the peltier-effect concentration still illustrated in U.S. Pat. Nos. 3,393,730 and 3,671,404, the disclosure of which is incorporated herein by reference. The flashed steam in conduit 70 is delivered to the evaporator coil 72 in first evaporator 74. The overhead vapor from evaporator 74 is transferred to the coil 76 through conduit 78 and the overhead vapor from second evaporator 80 is delivered to the coil 82 in third evaporator 84 through conduit 86.

The condensate from evaporators 74, 80, 84 collects in drain 88. The brine concentrates as it passes through drains 90, 92 into the third evaporator 84 and crystallizer 38. The by-product liquid remaining after crystallization is drained into tank 43 through drain pipe 94.

The relative diameters between inlet nozzle 22 and the device 20 depend on pressure in the aquifer. Pressurized geothermal brines will flow into device 20 under their own force. Low pressure brines can be educted into the device by the venturi effect by flowing the carrier solution past a small diameter orifice.

Figure 2:
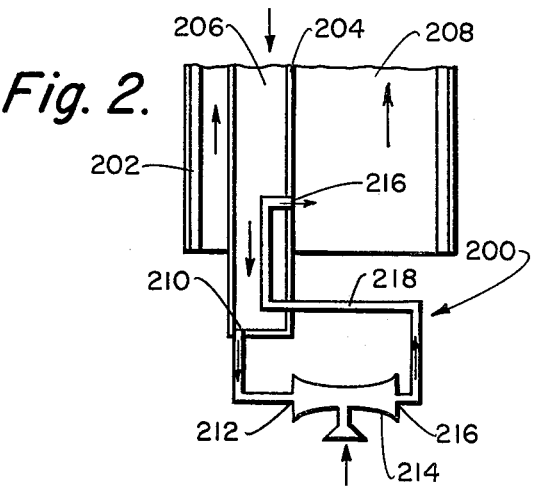
FIG. 2 is an enlarged detail of a further embodiment of a geothermal brine eductor assembly.

Another configuration of the eductor device is illustrated in FIG. 2. In this embodiment the eductor device assembly 200 is of a dimension such that it can pass through the opening in the larger upper casing member 202. An inner annular conduit 204 carries the eductor device 200 and forms the inlet path for the low concentration sweep or carrier fluid. The annular space 208 between the conduit 204 and the outer casing 202 forms the outlet path for the mixed recovery fluid. The dilute saline leaves the central conduit 206 through outlet 210 into the inlet 212 to the venturi. It sweeps brine into the venturi 214 and forms a mixture leaving the outlet 216. The mixture flows through pipe 218 into the lower extension of the central drill casing 204 and flows upwardly through outlet 216 into the annulus 208.

Figure 3:
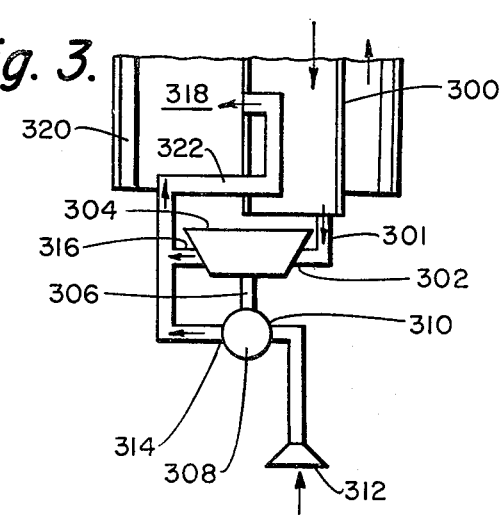
FIG. 3 is an enlarged detail of a turbine-pump geothermal brine eductor device.

In the embodiment of FIG. 3, a downhole power recovery turbine-pump eductor device passes through the upper casing member 320 and is connected to the end of central casing 300. The dilute saline is pumped at high velocity down central casing 300 through outlet 301 into the inlet 302 of the turbine 304. The fluid drives turbine 304 and pump 308 through the rotating turbine shaft 306. The inlet 310 of the pump 308 picks up concentrated geothermal brine from the aquifer through nozzle 312. The output 314 of the pump combines with the output 316 of the turbine to form a diluted mixture within conduit 322 which passes through the extension of the central casing 300 and then through the side wall thereof into the annulus 318 of the well casing 320.

Figure 4:
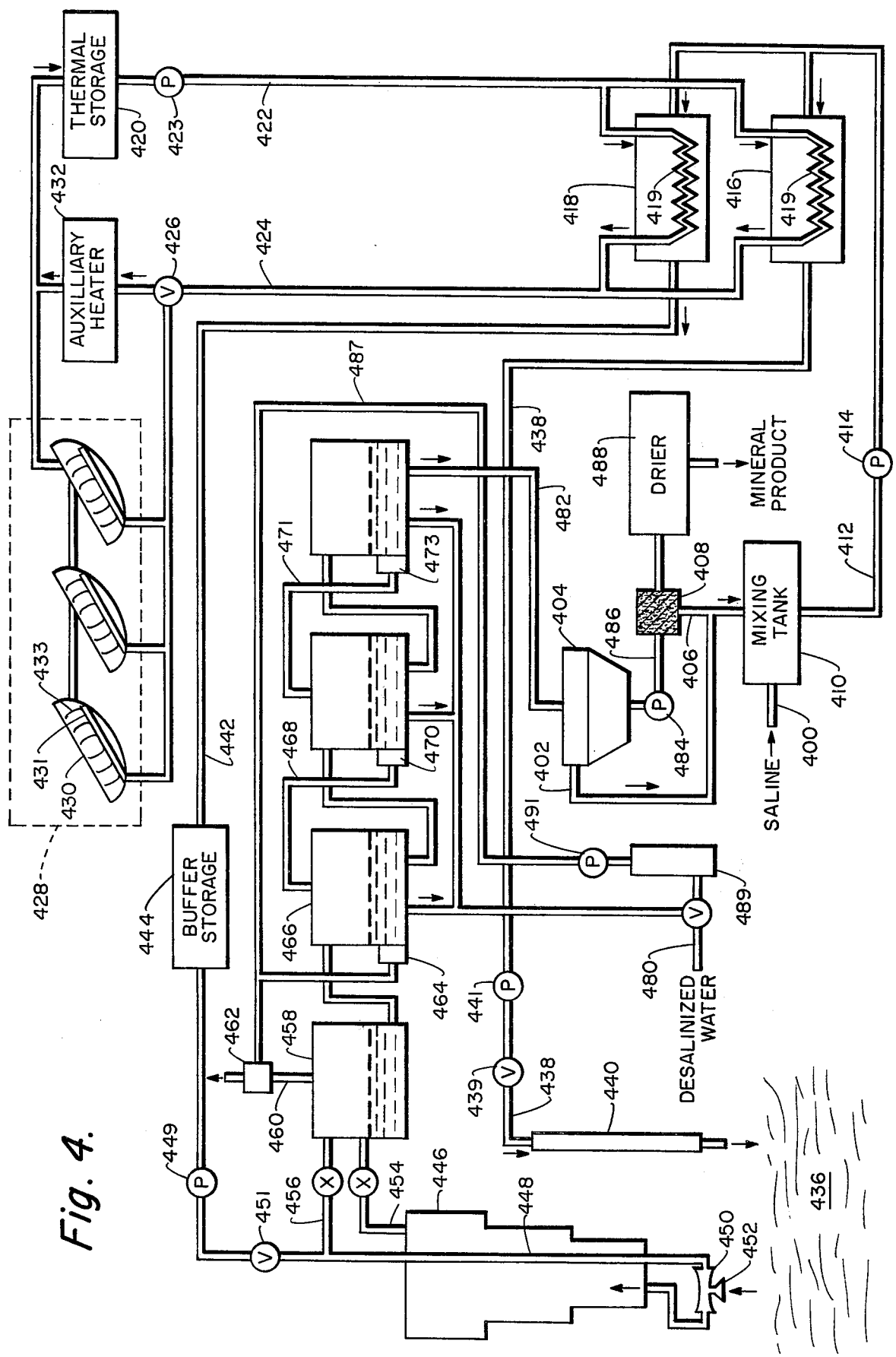
FIG. 4 is a schematic and block diagrammatic view of a more detailed system according to the invention.

A more detailed embodiment of the invention is illustrated in FIG. 4. Referring now to FIG. 4, dilute saline make-up water 400, overflow 402 from crystallizer 404 and the clarified liquor 406 from the filters 408 are combined in tank 410 to form a low saline solution. The solution is pumped through line 412 by means of pump 414 into heat exchangers 416 and 418.

The coils 419 of heat exchangers are provided with a continuous flow of heat exchange fluid such as Dowtherm A oil at a temperature of about 550° F. from thermal storage tank 420 through line 422 containing pump 423 and is returned to the fluid heating modules 428, 432, through line 424 usually at a temperature of about 400° F. During times of direct sunlight, variable ratio valve 426 will route the fluid through solar heating field 428 containing a plurality of solar concentrator collector heaters 430. The solar heaters may be of the tracking or non-tracking tube or panel type. A typical non-tracking tube-type collector 430 comprises an array of parabolic mirrors 433 disposed such that a large fraction of the incident solar radiation is focused onto the center tube 431 of the panel containing the heat exchange fluid. A more detailed description is contained in U.S. Pat. No. 4,024,908, the disclosure of which is incorporated herein by reference. Should valve 426 go to full flow through 432, solar collectors 430 must be deactivated to avoid excessive pressure buildup (day) or heat leak (night). During nighttime or cloudy days supplemental heating is provided by variable ratio valve 426 routing all or a portion of the returned heat exchange fluid to an auxilliary heater 432 such as a fossil fuel fired heater or by means of geothermal heat suitable provided by a closed circuit downhole heat exchanger such as disclosed in Van Huisen U.S. Pat. No. 3,470,943, the disclosure of which is incorporated herein by reference. The output from the auxilliary heater 432 is delivered to the thermal storage tank 420 to further smooth out continuous demand over all periods of operation and weather conditions.

A portion of the dilute saline is heated in heat exchanger 416 to a temperature of about 500° F. and then is recycled to the aquifer 436 through line 438 containing check valve 439 and high pressure pump 431 into reinjection well 440. The output of heat exchanger 418 may be delivered through line 422 into buffer storage tank 444 before being recycled to the recovery well 446. Buffer storage permits use of a low pressure pump and low velocity flow before recycling. It further provides excess capacity in the system to permit continuous operation should there be any shutdown in the heating system and also allows accommodation of different downhole recovery conditions. The heated fluid is pumped at high velocity by means of pump 449 post check valve 451 down line 448 through eductor device 450, nozzle 452 of which picks up brine which is diluted to form the fluid recovered at 454. A portion of the recycled fluid is by-passed through line 456 into flash tank 458, in order to increase the production of desalinized water.

The recovered diluted brine in line 454 and by-passed solution in line 456 are flashed in tank 458 to form overheat vapor in line 460 and concentrated brine. The non-condensible sour gases in line 460 are removed in separator 462 and the steam vapor delivered to the header of the heating tube bank 464 of the first effect 466 of the parallel flow multi-effect evaporation section. The overhead steam vapor 468 of the first effect is delivered to the header 470 of the second effect and the overhead vapor 471 of the second effect is delivered to the header 473 of the third effect. Condensate from all three effects is recovered as desalinized water at 480 or a portion may be recycled to the first effect of the evaporator through line 487 containing heater 489 and pump 491. The heater may be heated by geothermal, solar, fossil fuel or by heat exchange with the recycled carrier solution. The brine is concentrated as it moves forward through the effects. The brine output 482 from the last effect is delivered in turn to the crystallizer 404 and then pumped by means of pump 484 through line 486 to the rotary filters 408 and then to drier 488 to form the desired, dried, mineral salt product.

When a mixture of salts and other minerals results it can be separated subsequently by methods already known to the art. When drilling procedures permit selective penetration of geothermal strata, brine will often be of a predominant chemical constituent with impurities acceptable within certain commercial grades without need for further separation or processing. The heat exchangers are individually heated by closed loop high boiling temperature fluid, i.e., Dowtherm A, etc., to temperature levels suitable for re-entry to geothermal reservoir and for reinjection well(s) as shown to avoid any precipitation in field distribution piping or in reinjection system and so as to minimize adverse effects on otherwise favorable thermal gradients and geothermal reservoir pressures. Additional water make-up is required corresponding to the minimum quantity necessary to compensate process losses by evaporation. Where additional sources of water are available from neighboring brackish or saline (salt) water bodies, an equivalent amount of desalinized condensate can be produced from the process. This can be accomplished without adding additional equipment components except for scale up of flash tank and evaporators to handle additional flows, etc. and addition of a recycle line to the evaporation section. In any case, the low salinity solution is always diluted to lower its brine concentration prior to recycling and reinjection. Furthermore the saline flows to heat exchangers contain low brine concentrations which avoids fouling.

Use of solar concentrator field permits use of renewable and available solar energy to provide for heat losses in field distribution piping, reinjection wells, process equipment, piping, etc., and maintain geothermal reservoir in thermal balance so that power extraction operations if also desired can be accommodated without adverse effects to geothermal field. For those periods of time when solar radiation may not be available during daylight hours (and for those hours at night) i.e. 24 hour operations can still be maintained by use of buffered thermal storage which can be charged during periods of peak solar insulation and/or augmented by auxilliary fossil fuel fired or geothermal hot water or steam heater to permit draw down to acceptable temperature recycling or reinjection levels during night or for normally cloudy periods. For extended periods, auxilliary heat can be added to buffer storage as shown so as to avoid irreversible effects to prevailing favorable geothermal reservoir gradients.

The system of the invention can be modified other than as illustrated. For instance, in case of hot, dry salt zones recovery can be effected by injecting water into the zone to form a brine aquifer. The injection wells can later be utilized as the reinjection wells. As previously discussed, scaling is dependent on temperature and the casing of the wells should be thermally insulated. Furthermore, drilling of geothermal wells is both technically difficult and costly. However, use of the rock-melting Subterrene excavation concept is not subject to the high temperature failure of conventional rotary drilling equipment and the liquid rock melt produced can be formed into a glass lining to seal, support and insulate the walls of the borehole. As discussed in a report entitled *Technical and Cost Analysis of Rock-Melting Systems for Producing Geothermal Wells* by John H. Altseimer, Los Alamos Scientific Laboratory Report No. LA-6555-MS.

The system of FIG. 4 can be utilized to extract $5.0 \times 10^5$ lb/hr. of geothermal brine (30,000 ppm TDS) containing 1-5 weight percent non-condensible gases and a bottom hole temperature and 150-200 psig back pressure by means of a flow of $10^6$ lb/hr. of low salinity solution (5,000 ppm TDS).

It is to be realized that only preferred embodiments of the invention have been described and that numerous substitutions, modifications and alterations are permissible without departing from the spirit and scope of the invention as defined in the following claims.

What is claimed is:

1. A system for recovering geothermal brines comprising in combination:
    a geothermal well having a first end adjacent the surface and a second end disposed within a wet geothermal aquifer containing hot saline geothermal brine;
    brine eductor means disposed at said second end comprising a venturi having a first inlet receiving a high velocity flow of dilute saline carrier solution, a nozzle inlet into which a flow of said geothermal brine is educted, mixing means receiving said flow of solution and flow of geothermal brine from said inlets to form a recovery mixture having a saline content lower than that of said brine and an outlet communicating the mixture with the interior of said well;
    first conduit means within said well for delivering said high velocity flow of solution to said first inlet; and
    second means within said well for delivering said mixture from said outlet to the surface.

2. A system according to claim 1 further including separation means connected to said second delivery means for separating minerals from said mixture.

3. A system according to claim 1 in which the brine eductor means comprises a turbine having said first inlet receiving said flow of the low saline solution, an outlet connected to the mixing means, a pump operationally connected to the turbine having said second inlet for receiving a flow of geothermal brine and an outlet connected to the mixing means.

4. A system according to claim 2 in which the separation means includes flashing means and concentration means.

5. A system according to claim 4 in which the concentration means includes an evaporator for receiving the solution from the flashing means and having a heating section receiving the steam vapor from the flashing means, a crystallizer for receiving the concentrated solution from the evaporator and filter press for receiving the crystal product from the crystallizer.

6. A system according to claim 5 further including carrier solution recycle means including a tank for receiving liquid-streams from the evaporator, crystallizer and filter press.

7. A system according to claim 6 in which the recycle means further includes indirect heat exchange means and heating means connected to the heat exchange means for heating heat exchange fluid.

8. A system according to claim 7 in which the heating means includes a solar heater, an auxilliary heater and a buffer storage of heat exchange fluid.

9. A system according to claim 7 in which the auxilliary heater is a fossil fuel heater.

10. A system according to claim 7 in which the recycle means includes a reinjection well communicating with the aquifer.

11. A method of recovering geothermal brine from a geothermal aquifer comprising the steps of:
    establishing a high velocity flow of a carrier solution having a lower salt concentration than the brine from the surface into a geothermal well having a lower end disposed within the aquifer;
    flowing the solution through the well through a venturi having a nozzle communicating with the aquifer so that brine is educted from the aquifer into the solution to form a recovery mixture; and
    delivering the mixture through the well to the surface.

12. A method according to claim 11 in which the concentration of the mixture within the well is below the precipitation point at the conditions within the well.

13. A method according to claim 12 in which the carrier solution has a salt concentration that is at least 10% lower than the salt concentration of the brine and a temperature that is within ±50° C. of the temperature of the brine.

14. A method according to claim 13 further including the step of separating minerals from the recovered mixture.

15. A method according to claim 14 in which separating comprises flashing the mixture, concentrating the flashed mixture, crystallizing the concentrated mixture and filtering the crystallized product.

16. A method according to claim 15 in which liquids from the separating steps are combined with make-up water to form the carrier solution.

17. A method according to claim 16 further including the step of heating the carrier solution before delivery to the well.

18. A method according to claim 17 in which the carrier solution is heated in a heating circuit including a solar radiation heater, an auxilliary heater and a thermal buffer storage.

19. A method according to claim 16 further including the step of recovering desalinized water from the concentration step.

20. A method according to claim 16 in which a portion of the carrier liquid is reinjected into the aquifer through a reinjection well.

21. A system according to claim 1 in which the geothermal aquifer contains brine containing 10,000 to 40,000 ppm of total dissolved solids is, at a temperature of 150° C. to 650° C. and is at a pressure of 50 to 300 psig.

22. A system according to claim 21 in which the flow rate of the carrier solution is from $10^4$ to $10^7$ pounds per hour, has a salt concentration at least 10% lower than that of the brine and is not a temperature within ±50° C. of the temperature of the brine.

23. A method according to claim 13 in which the flow rate of the carrier solution is from $10^4$ to $10^7$ pounds per hour.

24. A method according to claim 23 in which the aquifer includes a brine having total dissolved solids of 10,000 to 40,000 ppm, and has a temperature of 150° C. to 650° C. and a pressure of 50 to 300 psig.

25. A system according to claim 1 in which said well includes an insulated outer casing.

* * * * *